United States Patent
Bruck et al.

(10) Patent No.: US 9,358,643 B2
(45) Date of Patent: Jun. 7, 2016

(54) METHOD FOR BUILDING A GAS TURBINE ENGINE COMPONENT

(71) Applicant: Siemens Energy, Inc., Orlando, FL (US)

(72) Inventors: Gerald J. Bruck, Oviedo, FL (US); Ahmed Kamel, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 14/460,566

(22) Filed: Aug. 15, 2014

(65) Prior Publication Data

US 2016/0045990 A1 Feb. 18, 2016

(51) Int. Cl.
*B23K 9/04* (2006.01)
*B23P 6/00* (2006.01)
*F01D 5/28* (2006.01)

(52) U.S. Cl.
CPC .. *B23P 6/007* (2013.01); *F01D 5/28* (2013.01)

(58) Field of Classification Search
CPC ........... B23K 35/0255; B23K 35/0244; B23K 26/32; B23K 26/342; B23K 2201/001; B23K 2201/04; B23K 2203/52
USPC ........... 29/428, 889.1, 889.7, 889.71; 219/73.21, 121.64, 121.66, 121.73, 219/121.77
See application file for complete search history.

(56) References Cited

U.S. PATENT DOCUMENTS

| | | | |
|---|---|---|---|
| 3,448,241 A | 6/1969 | Buckingham | |
| 3,627,979 A | 12/1971 | Quaas | |
| 4,331,857 A | 5/1982 | Crisci | |
| 4,741,974 A | 5/1988 | Longo | |
| 4,818,562 A | 4/1989 | Arcella et al. | |
| 4,903,888 A * | 2/1990 | Clark | B23K 9/046 219/121.45 |
| 5,372,861 A * | 12/1994 | Kerrand | C23C 4/12 427/556 |
| 5,438,441 A * | 8/1995 | Rockstroh | G02B 5/32 219/212.6 |
| 6,532,656 B1 * | 3/2003 | Wilkins | B23K 31/02 29/402.13 |
| 6,539,620 B1 | 4/2003 | Smashey | |
| 6,750,430 B2 | 6/2004 | Kelly | |
| 6,908,288 B2 | 6/2005 | Jackson et al. | |
| 6,916,387 B2 | 7/2005 | Lulofs | |
| 7,653,995 B2 | 2/2010 | Morin | |
| 2006/0248719 A1 | 11/2006 | Szela et al. | |
| 2007/0007260 A1 * | 1/2007 | Steinhardt | B23P 6/007 219/121.64 |
| 2009/0246031 A1 * | 10/2009 | Rose | B23K 9/044 416/223 R |
| 2011/0052386 A1 | 3/2011 | Schoonover et al. | |
| 2012/0181255 A1 | 7/2012 | Bruck | |
| 2013/0136868 A1 | 5/2013 | Bruck et al. | |
| 2013/0140278 A1 | 6/2013 | Bruck et al. | |
| 2014/0099476 A1 | 4/2014 | Subramanian et al. | |

FOREIGN PATENT DOCUMENTS

| | | | | |
|---|---|---|---|---|
| JP | 2009006509 A | * | 1/2009 | ........... B29K 26/067 |
| WO | 2014121060 A1 | | 8/2014 | |

* cited by examiner

*Primary Examiner* — Thien S Tran

(57) ABSTRACT

A method, including: providing a layer of powder material (106) on a substrate (12) having protruding rib material (26); and traversing an energy beam (100) across the layer of powder material to form a cladding layer (10) around and bonded to the protruding rib material, wherein the cladding layer defines a layer of an airfoil skin (94).

20 Claims, 4 Drawing Sheets

METHOD FOR BUILDING A GAS TURBINE ENGINE COMPONENT

FIELD OF THE INVENTION

The invention relates to building up an airfoil by depositing cladding layers using an energy beam and control optics. In particular, the invention relates to encircling protruding rib material by the cladding layers.

BACKGROUND OF THE INVENTION

Blades used in the turbine section of gas turbine engines are exposed to combustion gases, high mechanical force, and foreign object impact. This, coupled with the high operating temperature, create high levels of stress in the blade. Blade tips, blade airfoil sections, and blade platforms are particularly susceptible to stress related damages, including areas of wear and cracks. Blade tips, (also known as tip caps), include blade tip shelves (an end piece of the airfoil) and blade squealers (elevated material surrounding the blade tip). The cracks may extend from the tip of the airfoil downward toward the platform, sometimes extending past the blade shelf adjacent the blade tip.

It is known to replace worn or cracked blade squealers with non-structural replacement material. This replacement material is considered non-structural primarily because the stresses are relatively low in this location, and as a result, consequences of damage are relatively minimal in terms of performance. Unfortunately, cracking is very often found below (toward the platform) the tip shelf, extending into the airfoil body. For example, the cracks may extend 30 mm below the blade tip. Replacement of this material (below the squealer) is more difficult and must be considered to be of a more structural requirement, wherein certain minimum mechanical properties must be attained in order to sustain the greater stresses encountered in the airfoil body.

For the most difficult to weld superalloys, there is no known process to replace such extensive portions of a turbine blade. Grinding out and re-welding cracks using a hot box to maximize material ductility during the process has met with limited success. Cutting off the entire distressed blade tip and welding is not possible for at least two reasons. First, the material itself does not accommodate butt welding. It would crack due to shrinkage stresses and high restraint. Second, ribs disposed within the airfoil (serving structural function and cooling air management) could not be accessed for butt welding. Consequently, there is room in the art for improved methods of building and/or repairing blade airfoils.

BRIEF DESCRIPTION OF THE DRAWINGS

The invention is explained in the following description in view of the drawings that show.

DETAILED DESCRIPTION OF THE INVENTION

The present inventors have devised a method of building up an airfoil section of a gas turbine component having an airfoil skin structurally supported by internal ribs, such as a turbine blade. This is accomplished by forming layers of cladding on a bonding surface of a substrate using scanning optics to a melt powder placed on the bonding surface. The cladding layers are deposited around existing rib material that protrudes above the bonding surface, and the cladding layer bonds to the bonding surface and the protruding rib material. The scanning optics generate two melt pools that simultaneously travel along different paths on opposite sides of the protruding rib material to form each cladding layer. Each cladding layer forms a layer of the airfoil, includes side sections, and may include at least one rib section to create a rib where there is no protruding rib material already present. Being able to form an airfoil skin around existing rib sections enables building up of new airfoil sections and repair of existing airfoil sections in a manner not previously possible. With respect to worn airfoils, the inventors have recognized that the ribs are rarely distressed and so it may be most efficient to leave them in place for a repair using the disclosed methods.

In an exemplary embodiment where the substrate is a superalloy, the powder material may include a superalloy metal powder and a flux as described in U.S. patent publication number 2013/0140278 to Bruck et al. and incorporated in its entirety by reference herein. The ability to clad superalloys in this manner, together with the advanced scanning optics now available (e.g. Cambridge Technology Lightning II 4 kW, Scanlab powerSCAN 4 kW, Trumpf PFO 3D 8 kw and IPG 8 kW), and the deposition pattern disclosed herein enables buildup and repair of superalloy components that was not previously possible.

Figure 1:
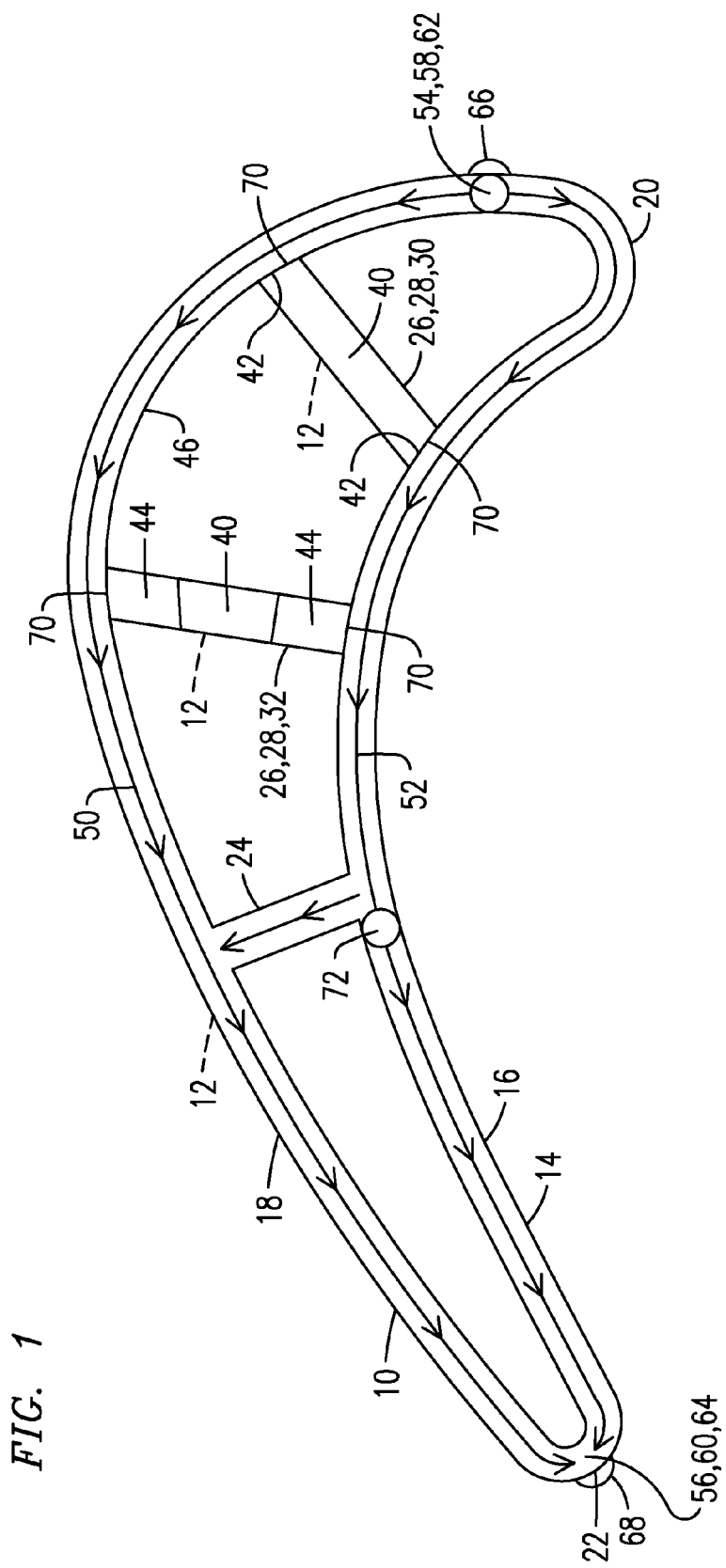
FIG. 1 schematically shows an exemplary embodiment of paths followed by an energy beam when forming an exemplary embodiment of a cladding layer, where the paths are superimposed on the cladding layer and the cladding layer is disposed on an exemplary embodiment of a substrate.

FIG. 1 schematically shows an exemplary embodiment of paths followed by an energy beam when forming an exemplary embodiment of a cladding layer 10, where the paths are superimposed on the cladding layer 10 and the cladding layer 10 is disposed on an exemplary embodiment of a substrate 12. The cladding layer 10 may be in the shape of an airfoil and have a skin 14 having a pressure side wall 16, a suction side wall 18, a leading edge 20, a trailing edge 22, and optionally an additional rib section 24. The additional rib section 24 represents a rib that is to be formed in addition to the already-existing ribs. The substrate 12 includes a bonding surface (not visible) under the cladding layer 10. Rib material 26 protrudes (out of the page) above the bonding surface and each instance of the rib material 26 represents some or all of a rib 28 around which the cladding layer 10 is deposited and to which the cladding layer 10 is bonded. In the exemplary embodiment shown, the substrate 12 includes first rib material 30 and second rib material 32. There may be any number of ribs 28, and there may also be any number of additional rib sections 24.

The first rib material 30 is not tapered toward a tip end 40. Consequently, the first rib material 30 represents essentially a full rib, less any fillets etc associated with bonding an untapered side surface 42 of the first rib material 30 to the pressure side wall 16. The second rib material 32 is tapered toward a tip end 40. Consequently, the second rib material 32 represents less than a full rib. With tapered rib material, the cladding layer 10 fills in the portion of the second rib material 32 lost to the taper and bonds to a tapered side surface 44 of the second rib material 32. Thus, whether the rib 28 includes the untapered side surface 42 or the tapered side surface 44, it is bonded to an inner perimeter 46 of the cladding layer 10.

In an exemplary embodiment without an additional rib section 24, the pressure side wall 16 and the suction side wall 18 may be formed by an energy beam guided by scanning options to form a first path 50 and a second path 52 along which respective melt pools travel. The first path 50 may start at a first path initiation point 54 and traverse a first wall, e.g. the suction side wall 18, until reaching a first path termination point 56. The second path 52 may start at a second path initiation point 58 and traverse a second wall, e.g. the pressure side wall 16, until reaching a second path termination point 60. The first path initiation point 54 and the second path initiation point 58 may be disposed at a common initiation point 62. The first path termination point 56 and the second path termination point 60 may be disposed at a common termination point 64. There may be an optional runon 66 formed at any of the initiation points, such as at the common initiation point 62. Likewise, there may be an optional runoff 68 formed at any of the termination points, such as the common termination point 64.

The location of the common initiation point 62 may be selected so that a length of the first path 50 and a length of the second path 52 are the same. In such an exemplary embodiment the scanning optics may be configured to traverse the energy beam along each path at the same rate, thereby taking the same amount of time for the energy beam to traverse the first path 50 as the second path 52 (i.e. the same duration). Alternately, the first path 50 and the second path 52 may be of different lengths. In this case it may take more time to form the longer path if the energy beam traverses each path at the same rate. When the two paths are of differing length but the traversal duration is desired to be the same for each path, the scanning of the energy beam can be still adjusted so that it traverses each path in the same amount of time. For example, if the first path 50 is twenty five percent longer than the second path 52 (e.g. 125 and 100 mm respectively), then the energy beam may spend twenty five percent more time forming the first path 50 as the second path 52 (e.g. 60 and 48 seconds respectively), while traversing each path at the same traversal duration (e.g. ~2.1 mm/sec for e.g. total process time of 108 seconds). This is made possible because the melt pool of the shorter path will remain liquefied long enough to permit the energy beam to spend more time forming the longer path, even if the power output of the energy beam is the same when forming each path.

When forming the cladding layer 10 a first melt pool (not shown) would follow the first path 50 and a second melt pool (not shown) would follow the second path 52. If one of the melt pools were to be initiated and the powder material at the common initiation point melted and then solidified before the other melt pool was initiated, then the solidified material at the common initiation point 62 would be remelted by the melt pool that initiated later in time. This remelting (remelt) can be avoided by starting both melt pools at the same time, or close enough in time that only one melt pool (not shown) is formed at the common initiation point 62. Avoiding remelt reduces the possibility for cracking and creates a stronger cladding layer. Likewise, the melt pool that traverses the first path 50 may be timed to meet with the melt pool that traverses the second path 52 such that they unite into a single melt pool at the common termination point 64, which avoids remelt at the common termination point 64. An optional runoff 68 may be positioned at the common termination point 64 and one or more melt pools may be extended off of the part at the runoff 68. Forming opposite wall sections simultaneously mitigates airfoil warping, and having a continuous, uninterrupted traversal minimizes remelts, which improves the structural integrity of the cladding layer 10.

When a melt pool approaches the untapered side surface 42 of the first rib material 26 the energy beam and/or scanning optics may change one or more operating parameters to ensure the cladding layer 10 bonds well at a junction 70 between the rib and the cladding layer 10. For example, a traversal rate of the energy beam may be slowed or power level of the energy beam may be increased to account for additional, localized heat sinking due to the amount of material at the junction 70. When a melt pool approaches the tapered side surface 44 the energy beam and/or scanning optics may likewise change one or more operating parameters to ensure the cladding layer 10 bonds well at a junction 70 between the rib and the cladding layer 10. In addition, the path may be widened to ensure the cladding layer 10 reaches the tapered side surface 44, as is discussed further below.

For portions of the side walls away from the junctions 70, the power output of the energy beam may be the same for the paths made to form the cladding layer 10. Alternately, the power output may vary. Still further, the power may be adjusted while the energy beam is traversing a path to accommodate varying heat requirements, such as the width (wall thickness) required for the airfoil.

In an exemplary embodiment with an additional rib section 24, one of the paths may be varied to form the additional rib section 24, while the other path may remain unchanged. For example, the first path 50 may remain unchanged, while the second path 52 may be changed to include the additional rib section 24. In such an exemplary embodiment, the second path would again start from the second path initiation point 58, which may be the common initiation point 62, and would end at the second path termination point 60, which may be the common termination point 64. However, while traversing the pressure side wall 16, the energy beam may cause the melt pool to leave the pressure side wall 16 temporarily to form the additional rib section 24. After forming the additional rib section 24 the energy beam would cause a new melt pool to form on the pressure side wall 16 at a secondary initiation point 72 and traverse the new melt pool to the second path termination point 60. The melt pool that forms the additional rib section 24 may be timed to arrive at a junction of the additional rib section 24 and the suction side wall 18 at the same time. This would avoid remelt at this location. It is possible that the cladding material on the pressure side wall 16 adjacent the secondary initiation point 72 and already processed by the energy beam may have solidified. Consequently, it is possible that there may be some remelt at the secondary initiation point 72 when the new melt pool is formed Alternately, upon reaching the additional rib section, the energy beam 100 could be shared essentially simultaneously along three paths. In such an exemplary embodiment three melt pools could exist simultaneously. The melt pool traveling along the pressure side wall 16 could split such that one melt pool would continue along the pressure side wall 16 while another melt pool would continue along the additional rib section and meet a third melt pool at the suction side wall 18, at which point a single melt pool would continue along the suction side wall 18. The traversal rate of the melt pool traversing the pressure side wall 16 and the traversal rate of the melt pool traversing the suction side wall 18 could be adjusted independently so the two arrive at the common termination point 64 simultaneously. In this exemplary embodiment remelt could be avoided altogether.

If the cladding process generates a layer of slag on the cladding layer it may be removed as the powder material is solidified, or at the completion of the formation of the cladding layer 10.

One or more cladding layers 10 may be deposited on a substrate to create or rebuild an airfoil, in which case the above process may be repeated to form as many cladding layers 10 as are necessary.

Figure 2:
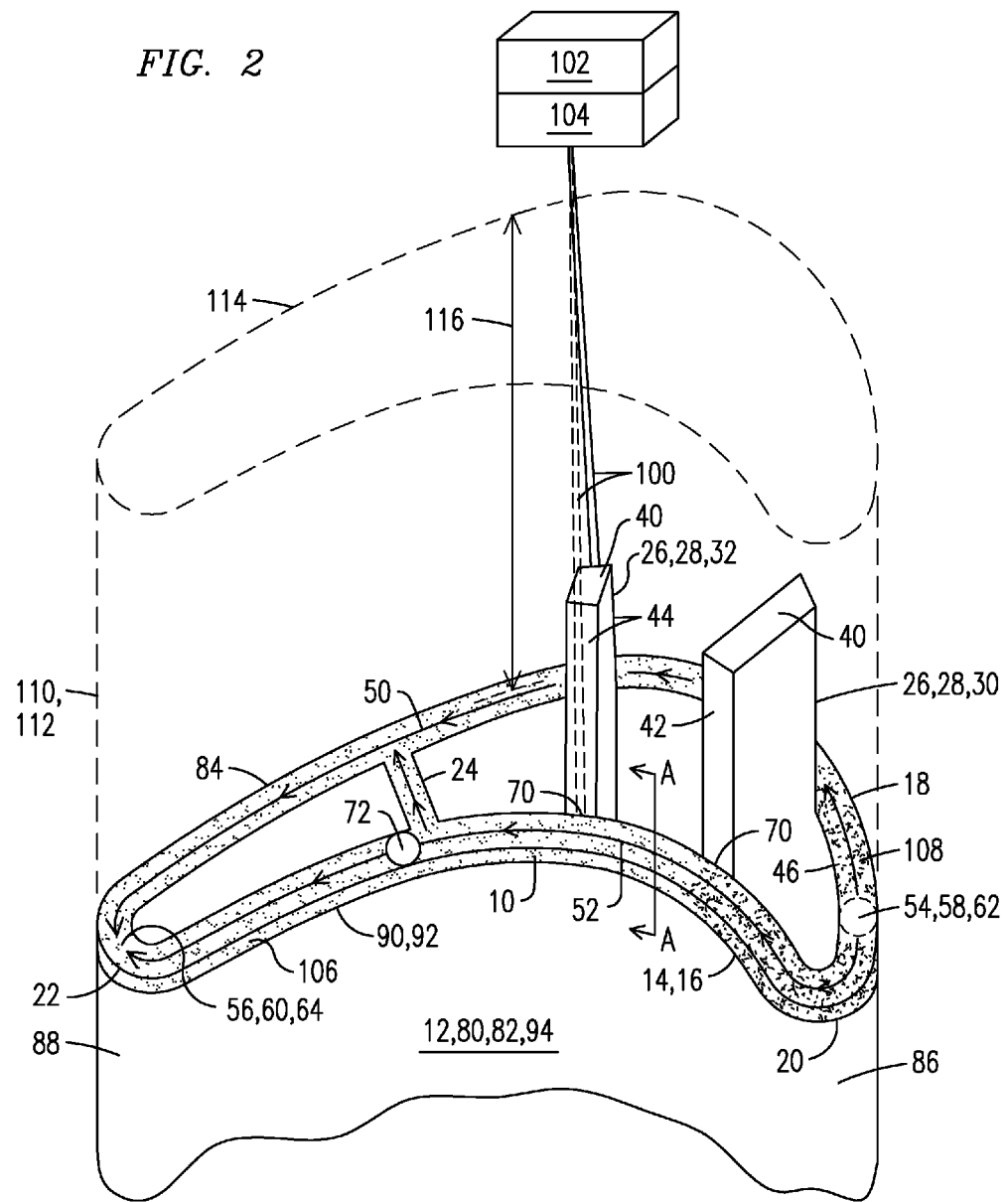
FIG. 2 is a schematic perspective view of the cladding layer of FIG. 1 being formed on the substrate toward a beginning of the formation process.

FIG. 2 is a schematic side view of the cladding layer 10 being formed on the substrate 12 toward a beginning of the formation process. In this exemplary embodiment the substrate 12 is an airfoil 80 having an airfoil pressure side 82, an airfoil suction side 84, an airfoil leading edge 86, an airfoil trailing edge 88, and a bonding surface 90, which is, in this exemplary embodiment, an edge 92 of an airfoil skin 94. An energy beam 100 emanating from an energy beam source 102 and guided by scanning optics 104 is processing powder material 106 placed on the bonding surface 90. It can be seen that the scanning optics 104 are able to direct the energy beam 100 toward one side of the cladding layer 10 as indicated by a solid energy beam line, and then to the other side of the cladding layer, as indicated by the dotted line. The scanning optics are capable of jumping the beam from one side to the other at a jump rate of approximately 3 m/s. Consequently, two melt pools can be sustained and traversed simultaneously. During the process the powder material 106 melts, solidifies, and bonds to the bonding surface 90 to form the cladding layer 10.

In an exemplary embodiment where a flux powder is incorporated into the powder material 106 a slag 108 may form on the cladding layer 10, which is removed before any subsequent cladding layers are deposited. In alternate exemplary embodiments the filler and flux could be preplaced in a distinct preform such as encapsulated in a sleeve that is then positioned at the process location. The filler material in the powder material may have the same chemical composition as the substrate or it may be different.

A dotted line defines a finished profile 110 of an unfinished portion 112 of the airfoil 80 when sufficient cladding layers 10 are deposited to complete the airfoil 80. (Ribs are not externally visible in a finished airfoil.) The finished profile 110 may represent an airfoil 80 that is being created for the first time, or it may indicate airfoil skin 94 that was previously part of the airfoil 80 but which was removed and which must be replaced to return the airfoil to its original condition. The latter may occur, for example, when an airfoil 80 that has been in service experiences cracking at a tip 114 of the airfoil 80. The airfoil 80 may be pulled from service and a tip end 116 of the airfoil skin 94 and the unwanted cracks therein are removed, but at least a portion of at least one of the ribs 28 remains, to permit the cladding repair operation disclosed herein. Thus, airfoil skin 94 may be removed to expose underlying rib material. If the airfoil skin 94 is removed from both the airfoil pressure side 82 and the airfoil suction side 84, the underlying rib material may have spanned (connected to) both sides of the removed airfoil skin 94.

The protruding rib material may or may not protrude all the way to the tip 114 of the airfoil 80. For example, there may be some rib material remaining all the way to an end of the rib 28 at the tip 114 of the airfoil 80. Alternately, some of the rib material at the tip 114 may be removed, but some protruding rib material may be left. In a non limiting example, 30 mm may be removed and cladding layers of 3 mm thickness may be formed until the 30 mm section is rebuilt. When ten layers are deposited the airfoil 80 would be returned to a finished state. An outer surface of the airfoil 80 may require finish machining. An inner surface may be accepted as is.

Figure 3:
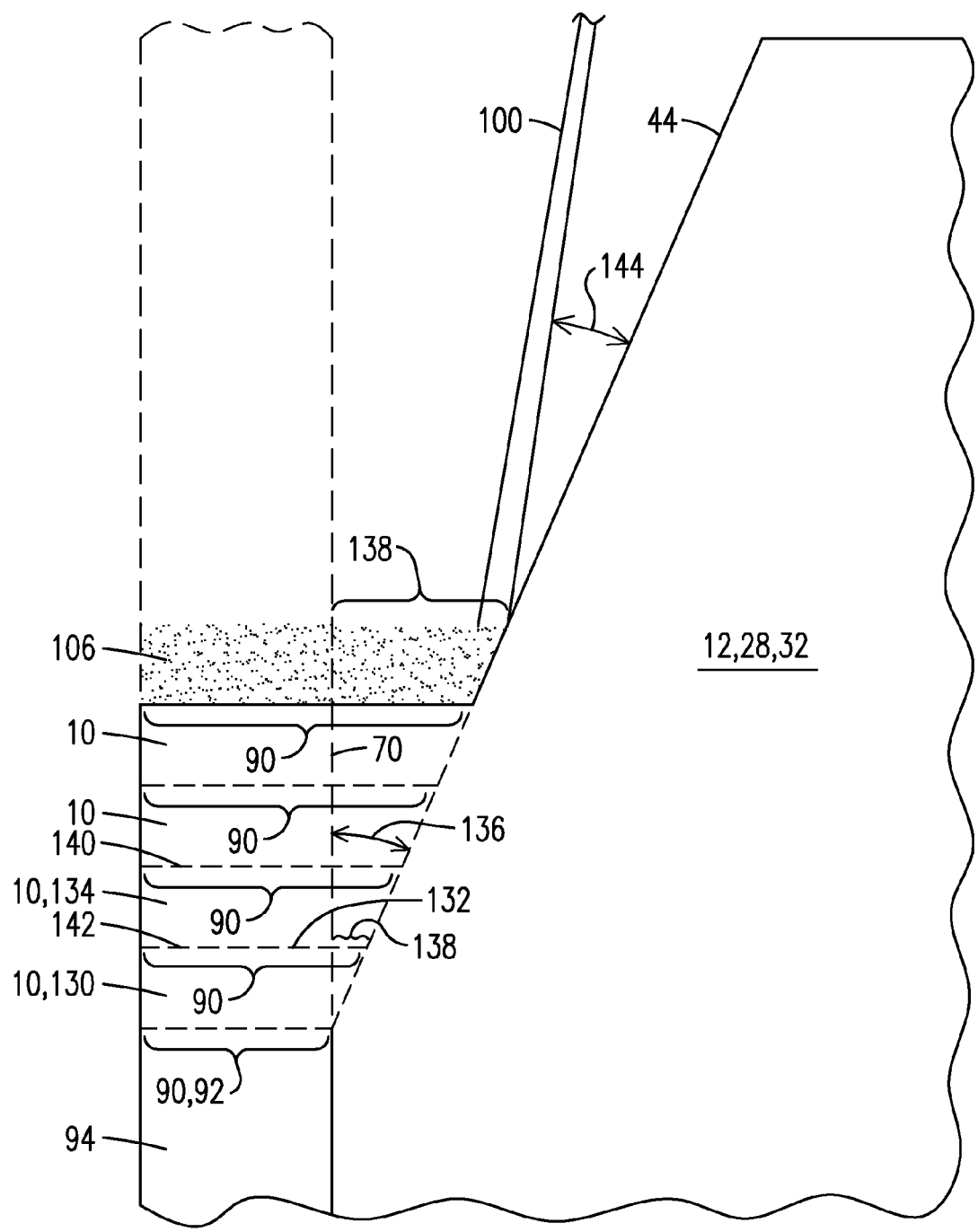
FIG. 3 is a schematic sectional view along A-A of FIG. 2 after several cladding layers have been formed.

FIG. 3 is a schematic sectional view along A-A of FIG. 2 after several cladding layers 10 have been deposited. The bonding surface 90 for a first cladding layer 130 is defined by the substrate 12 after the removal of material but before any cladding layers 10 are deposited. Once a cladding layer 10 is bonded to the substrate 12 the deposited cladding layer 10 becomes part of the substrate 12 from the perspective of the next cladding layer 10. Consequently, the bonding surface 90 for a subsequent bonding layer is a top 132 of an immediately prior cladding layer 10. This process repeats for each cladding layer 10

The junction 70 of the rib 28 and the airfoil skin 94 is oriented essentially toward a top of the page, while the tapered side surface 44 forms a taper angle 136 with the tapered side surface 44. As a result, a taper gap 138 forms at an upper surface 140 of each layer between the junction 70 and the tapered side surface 44. To accommodate this, the cladding layer 10 may be widened to bridge the taper gap 138 so the cladding layer 10 can bond to the tapered side surface 44. For example, a bonding surface 90 for a second cladding layer 134 would be the top 132 of the first cladding layer 130, which includes the edge 92 of the airfoil skin 94 plus the taper gap 138 for the first cladding layer 130. Thus, where adjacent the rib 28, the bonding surface 90 includes the airfoil skin 94 plus the taper gap 138 of the immediately prior cladding layer 10. Still using the second cladding layer 134 as the example, the widening of the energy beam for each layer may take into account the increased surface area of the instant bond surface 90, as well as the taper angle 136 within the instant bond layer, to ensure proper bonding of the cladding layer 10 to the tapered side surface 44 at both the upper surface 140 at a lower surface 142 of each cladding layer 10. While a constant taper angle 136 is shown, the taper angle 136 may vary at one or more cladding layers 10. The taper gap 138 may be filled in by the cladding layer 10 in a manner that creates any geometry desired, such as a stress reducing fillet, or other such feature.

In an embodiment the taper angle 136 may be selected to cooperate with a positioning of the energy beam source 102 and scanning optics 104 such that both sides of one rib 28 may be accessed by the energy beam 100 without having to translate the energy beam source 102. In other words, energy beam source 102 and scanning optics 104 may be positioned such that the energy beam 100 can jump to both sides of the rib 28 through the scanning optics alone and still have line-of-site access to the areas adjacent both tapered side surfaces 44 of the rib 28. This arrangement enables the energy beam 100 to move both melt pools past the rib 28 simultaneously and uninterrupted, while forming the proper bonds at the junctions 70.

The taper angle 136 may be selected to create an angle of incidence 144 between the tapered side surface 44 and the energy beam 100. This is effective to impart more heat to the tapered side surface 44 which, in turn, improves a bond between the tapered side surface 44 and the cladding layer 10. The angle of incidence 144 may be the same for both sides of the rib, or it may be different, depending on the local requirements.

While FIGS. 2 and 3 shown the energy beam 100 processing adjacent a tapered side surface, it may still be possible to fuse the cladding layer 10 to the untapered side surface 42 when the angle of incidence 144 is zero. (I.e. when there is no direct impingement of the energy beam 100 on the untapered side surface 42). In this case the local plasma and available superheat contained in the molten pool may be sufficient to achieve such lateral melting and fusion. Consequently, the cladding layer 10 may be bonded to all instances of adjacent rib side surfaces.

Figure 4:
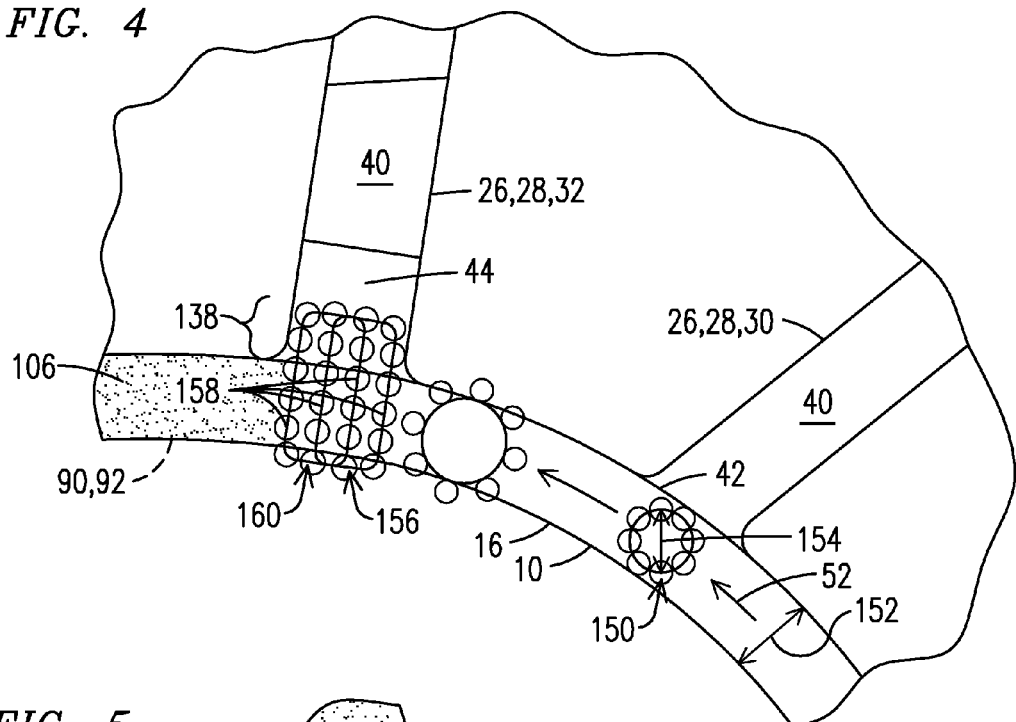
FIG. 4 schematically shows exemplary embodiments of patterns followed by the energy beam when forming the cladding layer adjacent ribs, where the patterns are superimposed on the cladding layer and the cladding layer is disposed on the substrate.

FIG. 4 schematically shows an exemplary embodiment of patterns followed by the energy beam 100 when forming the cladding layer 10. In this view the patterns are superimposed on the cladding layer 10, which rests on the substrate 12. In this exemplary embodiment the energy beam is guided in a circular pattern 150. A thickness 152 of the airfoil skin 94, and hence the cladding layer 10 may be 3.0 mm. A diameter 154 of the circular pattern 150 may be 3.5-4.0 mm and adjacent circular patterns 150 may overlap by approximately 1 mm as the energy beam traverses the second path 52. The energy beam may have, for example, a 1 mm diameter. In this exemplary embodiment the first rib material 30 is not tapered. Consequently, the circular pattern 150 need not increase in diameter when adjacent the first rib material 30 to ensure the cladding layer 10 bonds to the untapered side surface 42. In contrast, the second rib material 32 is tapered. The scanning optics 104 may adjust from the circular pattern 150 to a more oval pattern 156 when the pattern is adjacent the second rib material 32 in order to ensure the cladding layer 10 bonds to the tapered side surface 44. In a non limiting exemplary embodiment there may be a first oval pattern 156 with long sides 158 separated from each other by 2 mm adjacent an overlapping second oval pattern 160 with long sides 158 likewise separated from each other by 2 mm. The result is a near uniform coverage of the bonding surface 90, which includes the edge 92 of the airfoil skin 94 and the taper gap 138.

To form the additional rib section 24, the pattern 150 may be moved from the pressure side wall 16 to the suction side wall 18 (or the opposite direction, depending on the path chosen). Alternately, when the energy beam reaches the additional rib section the same widening of the energy beam that occurs in FIG. 4 may also occur, but where the pattern widens such that the long sides 158 span the pressure side wall 16 and the suction side wall 18 to form the entire additional rib section 24. This may require significant power, for example, 8-10 kW, but may expedite production where possible. Here again the exemplary embodiment is not meant to be limiting. The exact patterning may be tailored in ways known to those of ordinary skill in the art. For example, the energy beam could travel in a straight line back and forth between the pressure side wall 16 and the suction side wall 18, advancing one beam diameter after each pass.

Figure 5:
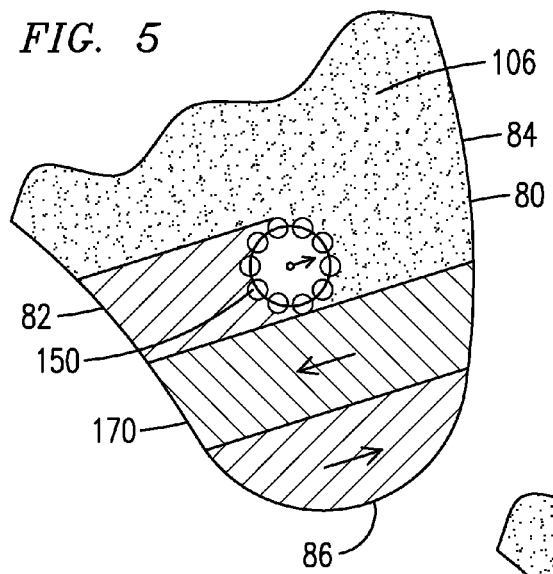
FIGS. 5-6 schematically show exemplary embodiments of patterns followed by the energy beam while forming exemplary embodiments of a blade tip shelf.

FIG. 5 schematically shows an exemplary embodiment of a pattern followed by the energy beam while forming an exemplary embodiment of a tip cap 170 of the airfoil 80, which may be necessary to complete the airfoil 80. An interior of the airfoil 80 may be filled with a ceramic material (e.g. zirconia, silica, alumina, titania, graphite, dry ice etc) in powder or solid form and the ceramic material may be positioned to surround an exterior of the airfoil 80. The powder material 106 is positioned on the ceramic material that fills the airfoil 80. In an exemplary embodiment the energy beam traverses a circular pattern 150 back and forth between the airfoil pressure side 82 and the airfoil suction side 84. Once the tip cap 170 is complete the ceramic material may be removed, leaving a completed airfoil 80. This exemplary embodiment is not meant to be limiting. The exact patterning may be tailored in ways known to those of ordinary skill in the art.

Figure 6:
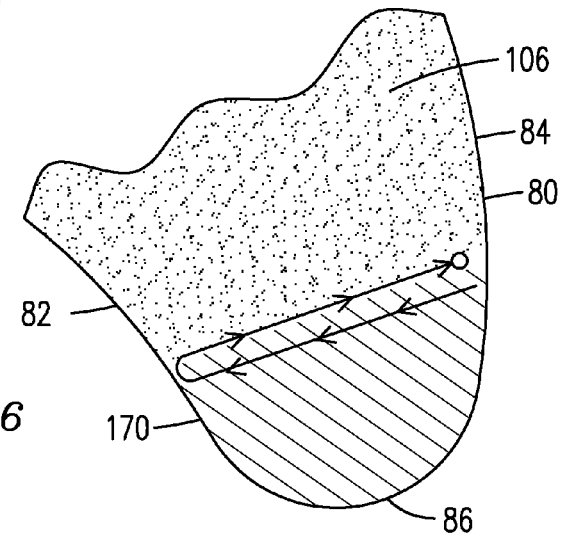

In a variation shown in FIG. 6, the energy beam may form the tip cap 170 in a different manner. Instead of forming distinct lateral deposits, the energy beam may be widened so that the melt pool travels from the airfoil leading edge 86 to the airfoil trailing edge 88. This may require significant power, for example, 8-10 kW, but may expedite production where possible. This exemplary embodiment is not meant to be limiting and other patterns may be used, such as a pattern similar to the overlapping, wide oval patterns that span from the airfoil pressure side 82 to the airfoil suction side 84 disclosed above.

From the foregoing it can be seen that the inventors have devised an innovative method for building up an airfoil in a manner not previously possible. Consequently, this represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method, comprising:
   providing a layer of powder material on a hollow substrate comprising pressure side skin, suction side skin, a rib connecting the pressure side skin to the suction side skin, and protruding rib material protruding from the rib and past the suction and pressure side skins; and
   traversing an energy beam across the layer of powder material to form a cladding layer around and bonded to the protruding rib material, wherein the cladding layer defines a layer of an airfoil skin.

2. The method of claim 1, further comprising removing at least a portion of airfoil skin from an existing component while leaving underlying rib material to form the substrate.

3. The method of claim 1, further comprising tapering the protruding rib material toward an end of a component comprising the airfoil skin and traversing the energy beam to extend the cladding layer to a tapered side surface of the protruding rib material.

4. The method of claim 3, further comprising selecting an angle of taper to permit line of site access to the layer of powder material on both sides of the rib material by a single energy beam source disposed above the end of the rib material.

5. The method of claim 4, further comprising selecting the angle of taper to permit an angle of incidence between the energy beam and the tapered side surface.

6. The method of claim 1, wherein the protruding rib material is not tapered toward an end of a component comprising the airfoil skin.

7. The method of claim 1, further comprising traversing the energy beam to form a first melt pool that forms a first side of the cladding layer and a second melt pool that concurrently forms a second side of the cladding layer.

8. The method of claim 7, further comprising creating the first melt pool and the second melt pool at a common initiation point and in a manner effective to prevent remelt of the cladding layer at the common initiation point.

9. The method of claim 8, further comprising terminating the first melt pool and the second melt pool at a common termination point and in a manner effective to prevent remelt of the cladding layer at the common termination point.

10. The method of claim 1, further comprising forming a layer of an additional rib as part of the cladding layer.

11. The method of claim 1, wherein the cladding layer and the substrate each comprise a superalloy.

12. A method, comprising:
    providing a layer of powder material on a bonding surface of a hollow substrate, the substrate comprising pressure side skin, suction side skin, a rib connecting the pressure side skin to the suction side skin, and rib material protruding from the rib past the bonding surface; and traversing an energy beam across the layer of powder material to form a cladding layer that defines a layer of an airfoil skin, the cladding layer comprising a bottom surface that is bonded to the bonding surface, and an inner perimeter that is bonded to the rib material.

13. The method of claim 12, further comprising starting to form a first side and a second side of the cladding layer from a common initiation point and in a manner effective to prevent remelt of the cladding layer at the common initiation point, and forming the first side while concurrently forming the second side.

14. The method of claim 13, further comprising terminating the forming of the first side and the second side at a common termination point and in a manner effective to prevent remelt of the cladding layer at the common termination point.

15. The method of claim 12, further comprising forming the substrate by removing scrap airfoil skin from a first and a second side of an airfoil while leaving at least some rib material that spanned the removed airfoil skin, thereby forming the substrate, wherein the bonding surface is an edge of airfoil skin that was not removed and the rib material protrudes from the edge toward an end of the airfoil.

16. The method of claim 12, further comprising tapering the protruding rib material toward an end of a component comprising the airfoil skin and traversing the energy beam to extend the cladding layer to a tapered side surface of the protruding rib material.

17. A method, comprising:

removing scrap airfoil skin from a hollow airfoil while leaving at least some rib material that spanned the removed scrap airfoil skin;

positioning a layer of powder material on an edge of airfoil skin remaining on the airfoil and in contact with a side surface of rib material that protrudes past the edge of the airfoil skin;

locating an energy beam source above an end of the airfoil;

traversing an energy beam from the energy beam source across the layer of powder material to form a cladding layer bonded to the edge of the airfoil skin and to the side surface of the rib material; and repeating the positioning and traversing steps until the removed scrap airfoil skin and any removed rib material is replaced with the cladding layers.

18. The method of claim 17, wherein the traversing step further comprises starting to form a first side and a second side of the cladding layer from a common initiation point and in a manner effective to prevent remelt of the cladding layer at the common initiation point, and forming the first side while concurrently forming the second side.

19. The method of claim 18, further comprising terminating the forming of the first side and the second side at a common termination point and in a manner effective to prevent remelt of the cladding layer at the common termination point.

20. The method of claim 17, further comprising tapering the protruding rib material toward an end of a component comprising the airfoil and traversing the energy beam to extend the cladding layer to a tapered side surface of the protruding rib material.

* * * * *